United States Patent Office 2,843,561
Patented July 15, 1958

2,843,561

COMPOSITIONS OF INTERPOLYMERIZED VINYL AROMATIC HYDROCARBONS, ACRYLIC ACID ESTERS AND RUBBERY BUTADIENE-STYRENE COPOLYMERS AND METHOD OF MAKING SAME

Francis L. Ingley, Midland, and Daniel Moldovan, Rhodes, Mich., assignors to The Dow Chemical Company, Midland, Mich., a corporation of Delaware No Drawing. Application March 29, 1955
Serial No. 497,802

8 Claims. (Cl. 260—45.5)

This invention concerns new compositions of matter which are interpolymerized mixtures of monovinyl aromatic hydrocarbons, acrylic acid esters and copolymers of butadiene and styrene.

The new compositions are transparent polymeric materials possessing good tensile and flexural strength, together with high elongation and impact strength. They can be calendered on rolls to form film or sheet, or molded by usual compression or injection molding operations, or by extrusion methods, to form plastic articles suitable for a variety of applications. The compositions are soluble in usual organic solvents, e. g. benzene, toluene, xylene, methyl ethyl ketone, or mineral spirits. Solutions of the polymeric materials in a solvent can be cast as layers on glass plates and dried to form film, or applied to wood, metal, or other surfaces and dried to form tough transparent protective films or surface coatings.

It has been discovered that the interpolymerization of mixtures or solutions of one or more monovinyl aromatic hydrocarbons of the benzene series, one or more lower alkyl esters of acrylic acid and one or more copolymers of butadiene and styrene, which copolymers are soluble in the monomers and contain ethylenic unsaturation, in proportions as hereinafter defined, results in the formation of transparent or substantially transparent polymeric products having good mechanical properties such as tensile strength, impact strength, elongation and hardness.

According to the invention the compositions are prepared by dissolving or dispersing a soluble copolymer of butadiene and styrene, which copolymer contains ethylenic unsaturation, in a mixture of monomers consisting of at least one monovinyl aromatic hydrocarbon, and at least one ester of acrylic acid and a lower aliphatic alcohol, e. g. ethyl acrylate or butyl acrylate, in proportions as hereinafter defined and heating the solution in mass to polymerize the monomers. The monomers copolymerize with one another and appear to copolymerize at least in part with the dissolved copolymer of styrene and butadiene which contains ethylenic unsaturation to produce a final composition containing the components in chemically combined or interpolymerized form.

It is important that the copolymer of butadiene and styrene be soluble, or infinitely swellable, in the monomers, i. e. the monovinyl aromatic hydrocarbon and the acrylic acid ester, to form a solution or colloidal dispersion of the copolymer that is free or substantially free from gels which are visible to the naked eye. The presence or absence of such gels in the solution or dispersion can conveniently be determined by passing the solution, or a portion thereof, through a No. 1 grade Whatman filter paper. The visible gel particles, if present, are retained on the filter paper.

The soluble butadiene-styrene copolymers to be employed in preparing the interpolymerized compositions are unvulcanized copolymers, i. e. they contain ethylenic unsaturation and are soluble in the monomers as previously mentioned.

The copolymers of butadiene and styrene to be employed in preparing the compositions can be copolymers containing in chemically combined form from 40 to 80 percent by weight of butadiene and from 60 to 20 percent of styrene. Copolymers prepared from mixtures of from about 60 to 80 percent by weight of butadiene and from 40 to 20 percent of styrene are usually employed. Mixtures of any two or more of the butadiene copolymers, e. g. a mixture of a soluble copolymer of 40 percent by weight of butadiene and 60 percent of styrene and a soluble copolymer of about 75 percent of butadiene and 25 percent of styrene which mixture of butadiene copolymers forms clear or substantially clear gel-free solutions with the monomers, can also be used.

Methods of making the butadiene copolymers are well known. The copolymers are usually prepared by dispersing a mixture of the monomers in an aqueous solution of an emulsifying agent, then agitating, heating and copolymerizing the monomers.

The polymerization is accelerated by the addition of catalysts which provide oxygen such as hydrogen peroxide, benzoyl peroxide, tert.-butyl hydroperoxide, cumene peroxide, potassium persulfate, etc. The catalyst is usually employed in amount corresponding to from 0.1 to 2 percent by weight of the materials to be polymerized.

The soluble butadiene copolymers are usually obtained by stopping the copolymerization short of completion, e. g. when from 70 to 90 percent of the monomers are polymerized, then separating the unreacted monomers and recovering the copolymer from the aqueous colloidal solution or latex in usual ways, such as by coagulation of the latex, washing and drying the copolymer, or by drying of the latex on heated rolls, or spray drying the latex. Mixtures of the butadiene copolymers, when employed, are preferably obtained by mixing together latexes of the respective copolymers and thereafter recovering the polymer from the mixture of latexes, e. g. by drying the mixture and recovering the dried latex solids.

The soluble butadiene copolymer, or a mixture of two or more of such copolymers of butadiene and styrene, is employed in amount sufficient to form with the monomers, i. e. the monovinyl aromatic hydrocarbon and the acrylic acid ester starting materials, a clear or substantially clear solution or colloidal dispersion containing from 5 to 10, preferably from 6 to 9, percent by weight of the butadiene-styrene copolymer. The employment of the butadiene-styrene copolymer in amount less than 5 percent by weight of the final composition results in a polymeric product having low impact strength. The employment of the copolymer in amount greater than 10 percent of the compositions results in formation of final polymeric products which are soft and have poor tensile strength.

Suitable monovinyl aromatic hydrocarbons are styrene, ortho-, meta- and para-vinyltoluene, vinylxylene, ethylvinylbenzene, isopropylvinylbenzene, ethylvinyltoluene, or mixtures of any two or more of such monovinyl aromatic hydrocarbons. Styrene is preferred.

The alkyl ester of acrylic acid to be employed in preparing the compositions is an ester of acrylic acid and a saturated monohydric aliphatic alcohol containing from one to four carbon atoms in the molecule. Examples of suitable acrylic acid esters are methyl acrylate, ethyl acrylate, propyl acrylate or butyl acrylate, or mixtures of any two or more of such acrylates. Said acrylates have the general formula:

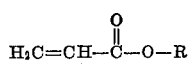

wherein R represents an alkyl radical containing from one to four carbon atoms.

The monovinyl aromatic hydrocarbon and the acrylate starting materials are employed in proportions corresponding to from 50 to 60 percent by weight of the monovinyl aromatic hydrocarbon and from 50 to 40 percent of the acrylate.

The compositions are prepared by forming a solution of the monomers, e. g. a mixture of equal parts by weight of styrene and ethyl acrylate, containing from 5 to 10, preferably from 6 to 9, percent by weight of the butadiene copolymer and heating the solution to polymerize the monomers.

The solution or colloidal dispersion of the copolymer of butadiene and styrene in the monomeric materials can be prepared by first dissolving the butadiene copolymer in the monovinyl aromatic hydrocarbon, then adding the acrylate in the desired proportion, or by dissolving the copolymer in a mixture of the acrylate and the monovinyl aromatic hydrocarbon starting materials.

The starting solution of the butadiene copolymer in the monomers is usually prepared at ordinary temperatures or thereabout, by agitating a mixture of the ingredients at atmospheric or substantially atmospheric pressure, preferably in the absence or substantial absence of air or oxygen.

The solution is usually filtered to remove undissolved gel particles of the butadiene copolymer, together with any inert solids or impurities, e. g. dirt or scale, prior to heating of the solution to produce the interpolymerized resinous compositions.

In practice the copolymer of butadiene and styrene is dissolved or dispersed in a mixture of the monovinyl aromatic hydrocarbon and the acrylate in the desired proportions. The solution or colloidal dispersion is heated in bulk, i. e. in the absence or substantial absence of an inert liquid medium, to polymerize the monomers. The polymerization can be carried out at temperatures between 60° and 220° C., preferably from 80° to 150° C., in the presence or absence of a catalyst.

The polymerization is accelerated by the addition of catalysts which provide oxygen. Examples of suitable polymerization catalysts are benzoyl peroxide, lauroyl peroxide, di-tert.-butyl peroxide, cumene peroxide, di-tert.-butyl diperphthalate, tert.-butyl perbenzoate, or tert.-butyl hydroperoxide. The catalyst is employed in amount corresponding to from 0.01 to 0.1 percent by weight of the solution or materials to be interpolymerized, but is not required in practice of the invention.

The resulting interpolymer product can be devolatilized, e. g. by heating the same to its melting temperature or above under subatmospheric pressure in a vacuum chamber, or by milling, compounding or otherwise mechanically working the product while it is in a heat-plastified condition. Milling or compounding of the heat-plastified interpolymerized product tends to break down and destroy or solubilize any insoluble gel particles such as are sometimes formed during the polymerization reaction, and, thus, frequently improves the appearance of the product. The heat-plastified interpolymer product may be subjected to subatmospheric pressure while being milled, e. g. on compounding rolls, so as to facilitate vaporization of any volatile ingredients therefrom during the operation. The devolatilization and hot-milling operations just mentioned are desirable, but are not required.

Small amounts of additives such as dyes, pigments, plasticizers, stabilizing agents, antioxidants, or fillers, can be incorporated with the resinous composition in usual ways, e. g. by heat-plastifying the polymeric product on compounding rolls, and milling the same with the additive, but the presence or absence of such additives is not required. The additives when used are usually employed in amounts corresponding to from 0.5 to 10 percent by weight of the composition.

The resinous interpolymer product, either as obtained from the interpolymerization reaction, or after being subjected to one or more of the devolatilization, milling, or compounding operations just mentioned may be cut or ground to form particles or granules thereof, suitable for use in molding operations. The granular product can be compression-molded, or injection-molded, or extruded to obtain shaped articles of the same.

The following examples illustrate ways in which the principle of the invention has been applied, but are not to be construed as limiting its scope.

EXAMPLE 1

In each of a series of experiments, a copolymer of approximately 73.5 percent by weight of butadiene and 26.5 percent of styrene (GR–S type 1006 rubber) was dissolved in a mixture of 50 percent by weight of monomeric styrene and 50 percent of ethyl acrylate in proportions as stated in the following table. A charge of 500 grams of the solution, together with 0.05 percent by weight of benzoyl peroxide as polymerization catalyst, was sealed in a tin-lined container and polymerized by heating the same for 7 days at 90° C. and then for 3 days at 150° C. The container was stripped from the block of polymer, after which it was ground to a granular form suitable for molding. Portions of the polymeric product were compression molded to form test pieces of ⅛ × ½ inch cross section. These test pieces were used to determine the tensile strength and percent elongation values for the composition employing procedures similar to those described in ASTM D638–49T. Impact strength was determined by procedure similar to that described in ASTM D256–47T. Other molded test pieces were employed to determine a heat distortion temperature by a procedure of Heirholzer and Boyer, see ASTM Bull. No. 134 of May 1945, and a Rockwell hardness (15X) for the composition. Table I identifies the composition by giving the proportions in percent by weight of the rubber and monomers employed in preparing the same. The table also gives the properties of the compositions. All of the compositions formed transparent test pieces.

*Table I*

| Run No. | Starting Materials | | | Product | | | | |
|---|---|---|---|---|---|---|---|---|
| | Styrene, Percent | Ethyl Acrylate, Percent | Butadiene-Styrene Copolymer, Percent | Tensile Strength, lbs./sq. in. | Elongation, Percent | Notched Impact Strength, ft.-lbs. | Heat Distortion Temp., °C. | Rockwell Hardness, 15 X |
| 1 | 47.5 | 47.5 | 5 | 3,840 | 28.8 | 0.43 | 45 | |
| 2 | 47 | 47 | 6 | 3,780 | 37.0 | 0.96 | 49 | 128–172 |
| 3 | 46.5 | 46.5 | 7 | 3,760 | 134.5 | 1.28 | 50 | 130–175 |
| 4 | 46 | 46 | 8 | 2,780 | 157.0 | 2.31 | 47 | 111–160 |
| 5 | 45 | 45 | 10 | 2,390 | 52.5 | 1.74 | 50 | 67–145 |

EXAMPLE 2

In each of a series of experiments, a copolymer of approximately 73.5 percent by weight of butadiene and 26.5 percent of styrene (GR–S type 1006 rubber) was dissolved in a mixture of 60 percent by weight of monomeric styrene and 40 percent of ethyl acrylate in proportions as stated in the following table. A charge of 500 grams of the solution was polymerized by heating the same in a sealed container for 7 days at 90° C. and 3 days at 150° C. The polymeric product was cooled, removed from the container and ground to a granular form. Portions of the composition were compression molded to form test pieces of ⅛ x ½ inch cross section by 4 inches long. The properties for the composition were determined employing these test pieces and procedures similar to those employed in Example 1. Table II identifies the composition by giving the proportions in percent by weight of the ingredients from which it was prepared. The table also gives the properties of the product. All of the compositions formed transparent moldings.

cent by weight of styrene and 40 percent of butyl acrylate. The mixture was stirred at room temperature. A clear slightly viscous solution was obtained. The solution, together with 0.05 percent by weight of benzoyl peroxide as polymerization catalyst, was polymerized by heating the same in a closed container for 7 days at 90° C., and 3 days at 150° C. The polymeric product was a substantially transparent block. It was ground to a granular form. Portions of the product were compression molded to form test pieces of ⅛ x ½ inch cross section. These test pieces were used to determine properties for the polymeric product employing procedures similar to those employed in Example 1. The interpolymerized product had the properties:

Tensile strength _____ 1876 lbs./sq. in.
Elongation _____ 161.4 percent.
Notched impact strength _____ 4.3 ft.-lbs.
Rockwell Hardness (15X) _____ 23–75.
Color _____ Very slight haze.

We claim:
1. A resinous transparent polymeric composition of matter which comprises an interpolymerized solution of from 90 to 95 percent by weight of a mixture of monomers consisting of from 50 to 60 percent by weight of at least one monovinyl aromatic hydrocarbon of the benzene series and from 50 to 40 percent of at least one ester of acrylic acid having the general formula:

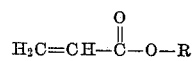

wherein R represents an alkyl radical containing from one to four carbon atoms, and from 10 to 5 percent by weight of at least one soluble unvulcanized butadiene copolymer containing in chemically combined form from 40 to 80 percent by weight of butadiene and from 60 to 20 percent of styrene.

2. A composition as claimed in claim 1, wherein the monovinyl aromatic hydrocarbon is styrene.

3. A composition as claimed in claim 1, wherein the ester of acrylic acid is ethyl acrylate.

4. A composition as claimed in claim 1, wherein the butadiene copolymer is a copolymer containing in chemically combined form from about 60 to 80 percent by Table II

| Run No. | Starting Materials | | | Product | | | | |
|---|---|---|---|---|---|---|---|---|
| | Styrene, Percent | Ethyl Acrylate, Percent | Butadiene-Styrene Copolymer, Percent | Tensile Strength, lbs./sq. in. | Elongation, Percent | Notched Impact Strength, ft.-lbs. | Heat Distortion Temp., °C. | Rockwell Hardness, 15 X |
| 1 | 56.4 | 37.6 | 6 | 3,180 | 30.9 | 2.36 | 48 | 91–149 |
| 2 | 55.2 | 36.8 | 8 | 2,930 | 25.0 | 3.16 | 55 | 100–156 |
| 3 | 54.6 | 36.4 | 9 | 3,050 | 29.2 | 3.27 | 50 | 87–147 |
| 4 | 54.0 | 36.0 | 10 | 3,070 | 12.2 | 1.74 | 54 | 76–142 |

EXAMPLE 3

In each of a series of experiments, a charge of 40 grams of a copolymer of approximately 73.5 percent by weight of butadiene and 26.5 percent of styrene (GR–S type 1006 rubber) was dissolved in 460 grams of a mixture of monomeric styrene and ethyl acrylate in proportions as stated in the following table. The solution, together with 0.03 percent by weight of benzoyl peroxide as polymerization catalyst, was sealed in a tin-lined container and polymerized by heating the same for 7 days at 90° C. and 3 days at 150° C. The polymeric product was cooled, removed from the container and ground to a granular form. Portions of the polymeric composition were compression molded to form test pieces of ⅛ x ½ inch cross section by 4 inches long. These test pieces were used to determine the properties for the composition employing procedures similar to those employed in Example 1. Table III identifies the composition by giving the proportions in percent by weight of the starting materials employed in preparing the same. The table also gives the properties of the product.

Table III

| Run No. | Starting Materials | | | Product | | | | |
|---|---|---|---|---|---|---|---|---|
| | Styrene, Percent | Ethyl Acrylate, Percent | Butadiene-Styrene Copolymer, Percent | Tensile Strength, lbs./sq. in. | Elongation, Percent | Notched Impact Strength, ft.-lbs. | Heat Distortion Temp., °C. | Rockwell Hardness, 15 X |
| 1 | 55.2 | 36.8 | 8 | 3,140 | 55 | 1.76 | 59 | 125–175 |
| 2 | 50.6 | 41.4 | 8 | 2,530 | 36.4 | 3.79 | 54 | 89–146 |
| 3 | 46.0 | 46.0 | 8 | 2,780 | 157 | 2.31 | 47 | 111–160 |

EXAMPLE 4

A charge of 40 grams of a copolymer of about 73.5 percent by weight of butadiene and 26.5 percent of styrene was added to 460 grams of a mixture of 60 perweight of butadiene and from about 40 to 20 percent of styrene.

5. A resinous transparent polymeric composition of matter which comprises an interpolymerized solution of from 90 to 95 percent by weight of a mixture of monomers consisting of from 50 to 60 percent by weight of styrene and from 50 to 40 percent of ethyl acrylate, and from 10 to 5 percent by weight of at least one soluble unvulcanized butadiene copolymer containing in chemically combined form from 40 to 80 percent by weight of butadiene and from 60 to 20 percent of styrene.

6. A composition as claimed in claim 5, wherein the butadiene copolymer contains in chemically combined form about 60 to 80 percent by weight of butadiene and from about 40 to 20 percent of styrene.

7. A resinous transparent polymeric composition of matter which comprises an interpolymerized solution of from 90 to 95 percent by weight of a mixture of monomers consisting of from 50 to 60 percent by weight of styrene and from 50 to 40 percent of butyl acrylate, and from 10 to 5 percent by weight of at least one soluble unvulcanized butadiene copolymer containing in chemically combined form from 40 to 80 percent by weight of butadiene and from 60 to 20 percent of styrene.

8. A method of making a substantially transparent resinous composition which comprises dissolving a soluble butadiene copolymer of from 40 to 80 percent by weight of butadiene and from 60 to 20 percent of styrene in a mixture of monomers consisting of from 50 to 60 percent by weight of at least one monovinyl aromatic hydrocarbon and from 50 to 40 percent of an ester of acrylic acid having the egneral formula:

$$H_2C=CH-\overset{\overset{O}{\|}}{C}-O-R$$

wherein R represents an alkyl radical containing from one to four carbon atoms in the molecule, in amount sufficient to form a 5 to 10 weight percent solution of the butadiene copolymer in the monomers and thereafter heating the solution at temperatures between 60° and 220° C. to polymerize the monomers.

References Cited in the file of this patent

UNITED STATES PATENTS

| | | |
|---|---|---|
| 2,123,599 | Fikentscher et al. | July 12, 1938 |
| 2,614,089 | Harrison et al. | Oct. 14, 1952 |
| 2,694,692 | Amos et al. | Nov. 16, 1954 |